United States Patent [19]
Oliver

[11] 3,819,074
[45] June 25, 1974

[54] BOAT LOADING APPARATUS

[76] Inventor: Clifford S. Oliver, 233 Fawn St., Golden, Colo. 80401

[22] Filed: Sept. 13, 1972

[21] Appl. No.: 288,598

[52] U.S. Cl............. 214/450, 224/42.1 H, 214/85.5
[51] Int. Cl............................................. B65g 67/02
[58] Field of Search ......... 214/450, 517, 85.5, 85.1, 224/42.1 H, 42.1 G, 42.1 E

[56] References Cited
UNITED STATES PATENTS

| | | | |
|---|---|---|---|
| 2,354,337 | 7/1944 | Smith................................ | 214/517 |
| 2,799,408 | 7/1957 | Overton............................ | 214/85.5 |
| 2,812,087 | 11/1957 | Zoller................................ | 214/85.1 |
| 3,039,634 | 6/1962 | Hobson et al..................... | 214/450 |
| 3,045,849 | 7/1962 | Tweten.............................. | 214/450 |
| 3,435,970 | 4/1969 | Sutton............................... | 214/450 |
| 3,450,285 | 6/1969 | Robinson........................... | 214/517 |

*Primary Examiner*—Robert J. Spar
*Assistant Examiner*—Kenneth Noland
*Attorney, Agent, or Firm*—Ancel W. Lewis, Jr.

[57] ABSTRACT

In boat loading apparatus for use on a vehicle there is provided an adjustable boat carrier rack to support the boat on the vehicle, a cable and cable guide arrangement including a swing arm movable to hold the boat away from the vehicle while a cable attached to the boat is being drawn over the free end of the swing arm, the swing arm being adjustably movable relative to the rack to accommodate different vehicles and a hoist for pulling the cable with one continuous winding of a winch at the end of the vehicle opposite the loading end.

17 Claims, 11 Drawing Figures

# BOAT LOADING APPARATUS

BACKGROUND OF THE INVENTION

This invention relates to improvements in apparatus for loading boats on a vehicle and more particularly to improved apparatus by which one person may load a boat onto a boat carrier rack on a vehicle with relative ease.

There are many advantages of carrying a boat on a rack on top of a motor vehicle as opposed for example, to drawing it by a trailer. The loading of a boat onto the top of a motor vehicle has heretofore required relatively complicated and complex structure making it expensive to purchase. Further prior known loading apparatus for boats which can be operated by one person characterized by relative ease of installation and ease of operation has not been available.

Accordingly, it is an object of this invention to provide a relatively easy to install, durable, and highly effective apparatus for loading a boat onto a boat carrier rack on top of a motor vehicle.

Another object of this invention is to provide a novel apparatus for loading a boat on a boat carrier rack on a motor vehicle which is readily adaptable to a wide variety and styles of conventional motor vehicles.

Yet a further object of this invention is to provide a novel boat loading apparatus which is readily and conveniently operable by one person to load a boat from a lower position at one end of the vehicle with one continuous pull on the cable.

Still a further object of this invention is to provide a novel apparatus for loading a boat from the ground level onto the top of a motor vehicle characterized by having a swing arm adjacent one end of the vehicle and adjustably movable relative to the vehicle arranged so that the free end thereof guides a draw cable attached to the boat until the arm reaches a vertical position whereupon it falls to an inboard position of rest whereby the boat may be drawn up onto the vehicle by pulling the cable in one continuous pulling action.

SUMMARY OF THE INVENTION

In accordance with the present invention in a preferred form shown there is provided an adjustably movable swing arm at the loading end of the vehicle having the free end arranged to guide a cable attached to the end of the boat so that the swing arm holds the boat away from the vehicle as it is drawn upwardly toward a loaded position and onto guide surfaces on the rack whereby once past center, the swing arm drops down onto a rest and the boat is drawn into the loaded position by further drawing the cable from a position opposite the loading end in one continuous pulling action.

Other objects, advantages and capabilities of the present invention will become more apparent as the description proceeds taken in conjunction with the accompanying drawings in which:

FIG. 10 is an enlarged cross-sectional view taken along lines 10—10 of FIG. 8; and FIG. 11 is an enlarged cross-sectional view taken along lines 11—11 of FIG. 6.

Figure 1:
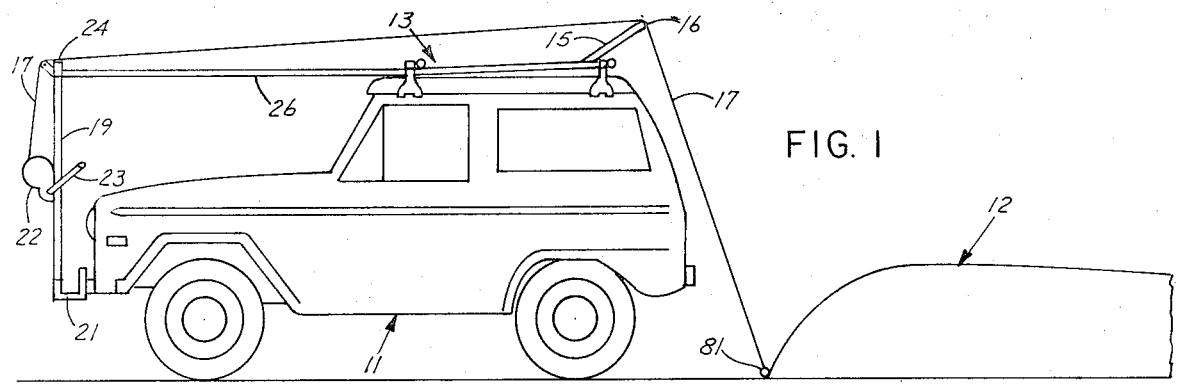
FIG. 1 is a side elevation view of a motor vehicle having boat loading apparatus mounted thereon with the boat being shown inverted and in an unloaded position just prior to loading.
Figure 2:
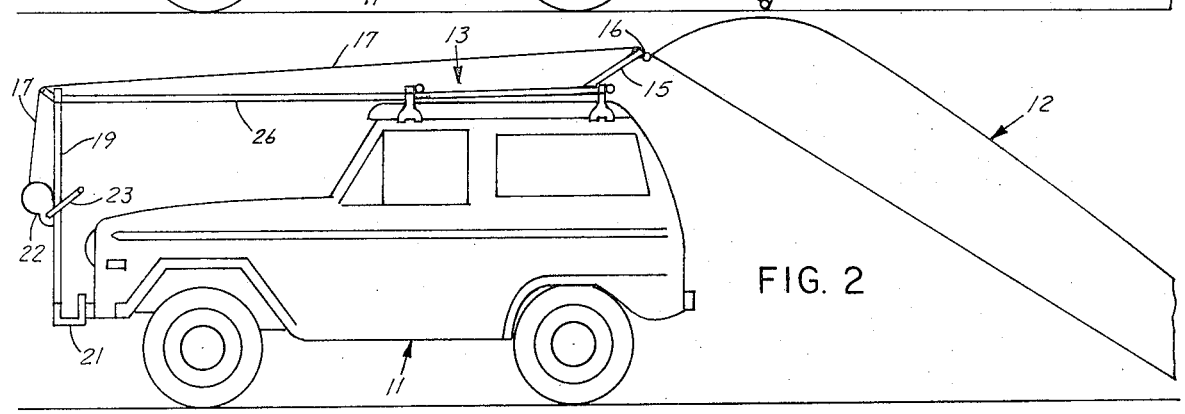
FIG. 2 is a side elevation view of the apparatus shown in FIG. 1 with the boat raised to the point where the cable hook engages the swing arm.
Figure 3:
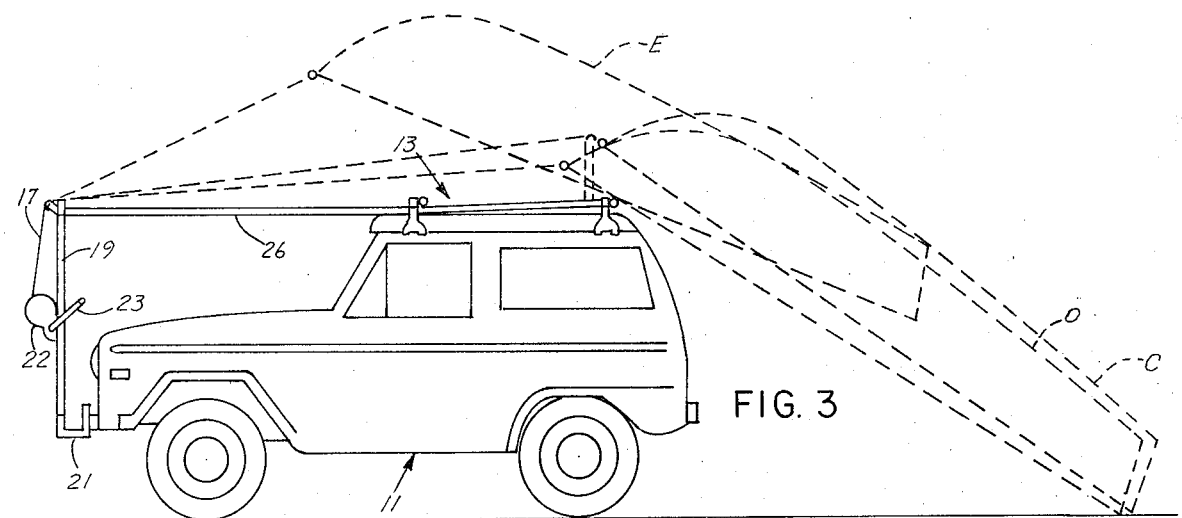
FIG. 3 is a side elevation view of the apparatus shown in FIG. 1 with the boat shown in dashed lines in three successive positions as it is moved toward the loaded position.

Referring now to the drawings in FIGS. 1-4 the boat loading apparatus shown is operatively associated with a vehicle 11 and a boat 12 disposed in an inverted position at the rear of the vehicle 11 with a boat carrier rack 13 mounted on top of the vehicle 11. A swing arm 15 is supported by the rack at the rear thereof having a pulley 16 at the free upper end thereof over which a cable 17 attached at one end to the boat 12 is reefed. An upright support member 19 is releasably supported in a bracket 21 clamped to the front bumper of the vehicle and a hoist or winch including a drum 22 with a crank handle 23 is mounted on the forward support member 14 which winds and unwinds the cable 17. A front pulley 24 is mounted forwardly and slightly above the support member 19 with the cable 17 extending from the drum 22 upwardly and then rearwardly over pulleys 24 and 16 and extending down to the front of the boat 12. Lateral support bars 25 with upright end portions 25a extend from opposite sides of the upright support member 19 and an intermediate support member 26 releasably connects between the upper end of front support member 19 and rack 13 to hold the upright support member erect when the boat is being drawn to the loaded position.

The boat carrier rack 13 may take a variety of conventional forms. The preferred boat carrier rack shown comprises spaced, forward and rear lateral support members 28 and 29, respectively, having side support brackets 31 at each end thereof releasably fastened to the rain gutter 32 of the vehicle together with laterally spaced, longitudinal support members 33 and 34 and interconnecting a central portion of said lateral support members 28 and 29. The forward lateral support member 28 has a pair of rollers 36 and 37 and rotatably mounted at the ends along the rear edge thereof and the rear lateral support member 29 has a single elongated roller 38 rearwardly of the rear lateral support member 29. These roller members provide low friction surfaces on which the boat will readily slide when drawn by the cable.

The boat carrier rack is arranged to adjust in length by providing a socket or a sleeve 41 secured to the underside of the front lateral support member 28 which slidably receives longitudinal support member 33 and a sleeve 42 secured to the underside of lateral support member 28 which slidably receives longitudinal support member 34. Each sleeve is provided with an aperture in the side and each longitudinal support member has a plurality of spaced apertures so that with alignment of the apertures in the two associated members, a locking pin 43 may be inserted thereto to facilitate the lengthening or shortening of the space between the lateral members 28 and 29 to accomodate vehicles of different dimensions.

The effective length of intermediate support member 26 is likewise adjustable by providing a sleeve 44 affixed to the underside of lateral support member 28 which telescopically receives member 26, with sleeve 44 having a side aperture which align with one of a plurality of apertures in member 26 to receive a locking pin 43. The rear end of member 26 is telescopically received in a sleeve 45 and releasably held by a locking pin 43 in associated apertures to facilitate the assembly and disassembly thereof.

The side support brackets 31 have a lower hook portion 47 which fits under the rain gutter together with a movable clamp head 48 which is adjustable up and down by means of a bolt fastener 49 mounted on a flange 50 and threaded into the clamping head 48. The upper portion of the bracket is slotted or has upstanding, spaced ear portions 52 and 53 which slidably receive the lateral members and are held at a selected position relative thereto by a bolt fastener 54. This arrangement permits the rack to be adjusted along its width to accomodate vehicles of different widths.

The lower end of swing arm 15 is mounted on an outer lateral shaft 61 which telescopes over an inner shaft 62. The ends of shaft 62 are affixed to the U-shaped end brackets 63 and 64 which fit down over longitudinal members 34 and 33, respectively. A plurality of spaced apertures are provided in the sides of members 33 and 34 and in brackets 63 and 64 through which locking pins 43 insert to permit the swing arm to be adjustably moved along the top of the vehicle to adjust the position of pulley 16 to meet the requirements of different boats and different vehicles. A biasing spring 65 has one end affixed to lateral support member 29 and the other at a midpoint on swing arm 15 to bias the swing arm toward the outboard position as shown in FIG. 11.

A rest for the swing arm in the inboard position is provided by a plate 67 secured to the support for the swing arm to move therewith between longitudinal support members 33 and 34 with a cushion 68 between upright ears 68 and 70. A pulley 72 is mounted on its side member 28 for removing the boat using the winch cable as described hereinafter.

The length of the upright support member 19 is adjustably movable to accomodate different vehicle heights by using two telescoping sections 19a and 19b with one having plurality of spaced apertures and the other an aperture which when in alignment receive a locking pin 43. The bracket 21 has a socket portion 21a which telescopically receives the lower end of upright support member 19 and held by a locking pin 43 to facilitate the ready removal and replacement thereof.

The construction of the carrier rack 13 and support member 19 shown is of hollow tubing having a square cross-section. The lateral support members for example may have a 1¼ inch cross-sectional dimension and the longitudinal support members a 1 inch cross-sectional dimension. While a square shape is shown it is understood that other shapes such as circular may be used. The locking pins 43 preferably are of the type which have a hinged drop finger at one end which turns at right angles to the supporting part once it is inserted into side oriented apertures as shown.

LOADING AND UNLOADING OPERATIONS

Figure 4:
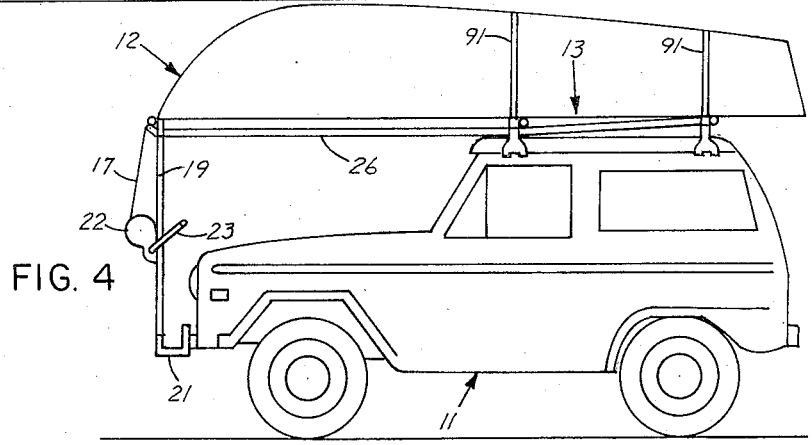
FIG. 4 is a side elevation view of the apparatus shown in FIG. 1 with the boat in the loaded position.
Figure 5:
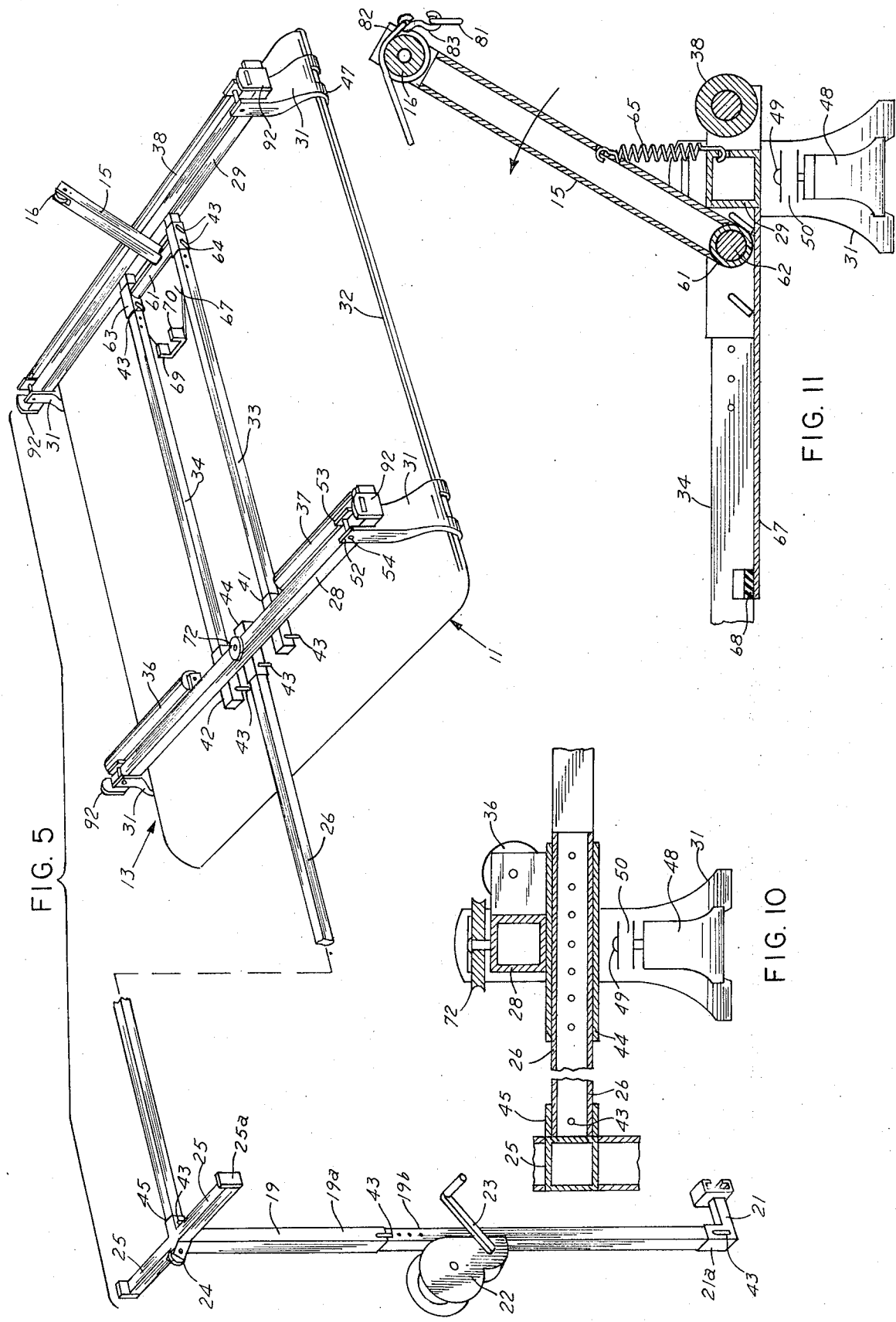
FIG. 5 is a perspective view of the boat loading apparatus shown in FIGS. 1-4.
Figure 6:
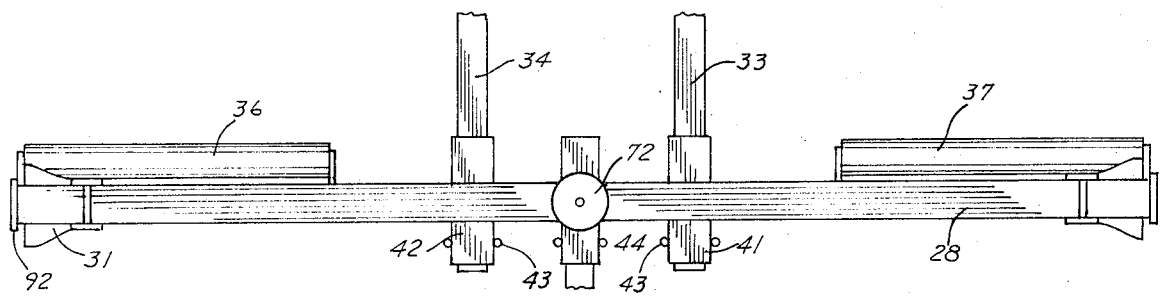
FIG. 6 is a top plan view of front portion of the rack.
Figure 7:
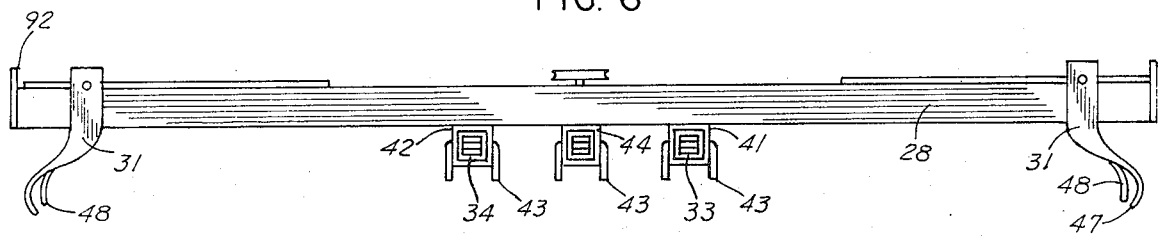
FIG. 7 is a front elevation view of the front portion of the rack shown in FIG. 6.
Figure 8:
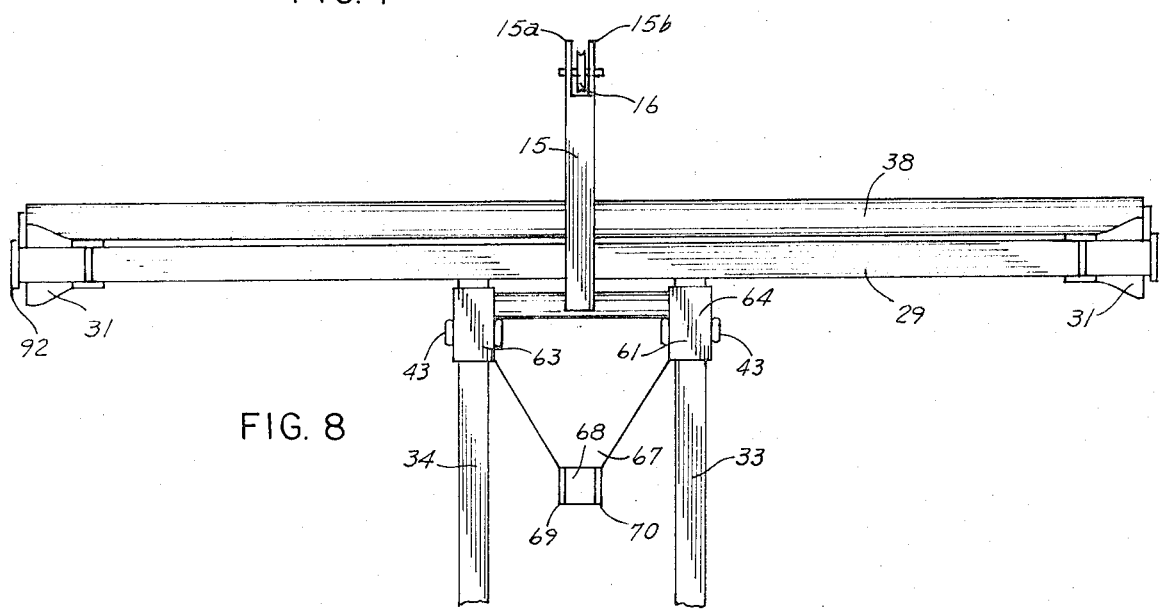
FIG. 8 is a top plan view of the rear portion of the rack and showing the swing arm in an upright outboard position.
Figure 9:
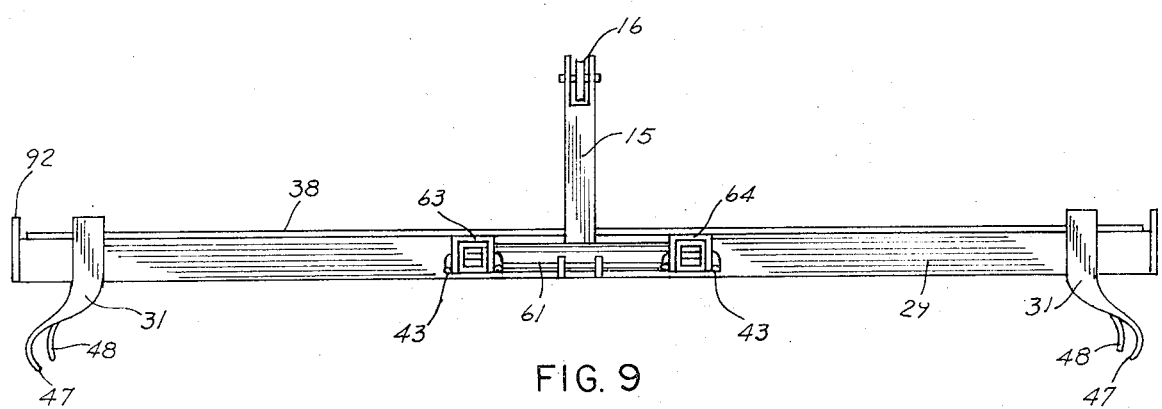
FIG. 9 is a front elevation view of the rear portion of the rack shown in FIG. 8.

In the loading operation of the above described apparatus the forward end of the boat 11 or bow is in an inverted position at the rear of the vehicle. The boat may be pulled into position from the lake or the like using the cable 17. The free end of the cable is attached to a ring 81 at the bow of the boat or attached inside the boat and the cable has an end loop 82 and hook 83. The boat is raised by having the operator at the forward end of the vehicle and turning the winch crank handle 23. At the beginning of the loading cycle the swing arm 15 extends rearwardly and upwardly at an angle and is supported in the outboard position by engaging lateral support member 29. The swing arm holds the cable 17 away from the vehicle. The bow of the boat is further raised as best seen in the sequence C, D & E until the end loop 82 in the cable reaches the pulley at which time the boat is at a substantial angle to the ground. As the cable is further wound on the winch drum, upstanding ear portions 15a and 15b are engaged by the end loop 82 and hook 83 and as best seen in FIG. 11 and then the arm begins to swing about the pivot shaft 62 with the movement of the cable. When the swing arm goes past center of a vertical position, it drops down against rest 68 and at the same time the sides of the boat will come down against the rear roller 38. The boat now is rollably supported on the rear roller 38 and is further drawn forwardly by continuing to wind the cable on the winch. The boat is at the fully loaded position when the forward end rests on the forward upright support and the forward roller. Straps 91 fasten in slots in end members 92 on the lateral support members to tie the boat down. The cable 17 remains attached to secure the forward end of the boat tight as best seen in FIG. 4. Lateral support bars 25 with portions 25a prevent excessive lateral or forward movmment of the boat.

To remove or unload the boat the cable is removed from the ring 81, reefed around pulley 72, and drawn to pull the boat rearwardly a sufficient distance for the user to drop it back onto the ground.

Although the present invention has been described with a certain degree of particularity, it is understood that the present disclosure was made by way of example and that changes in details of structure may be made without departing from the spirit thereof.

What is claimed is:

1. In boat loading apparatus for use with a passenger-type vehicle having vehicle body with a substantially flat top portion, the combination comprising:

a boat carrier rack with a pair of spaced, lateral support members having side support brackets at each end thereof adapted to releasably fasten to the top portion of the vehicle body, each said lateral support member being adjustably movable relative to the associated support brackets to adjust the effective width thereof, a pair of spaced, longitudinal support members connected between said lateral support members, said longitudinal support members being adjustably movable relative to said lateral support members to adjust the effective length thereof, and a roller mounted adjacent one of said lateral support members at the loading end to provide a low friction support surface for the boat, a swing arm pivotally mounted on said longitudinal support members about a lower pivot to swing between an inboard position and an outboard position as it swings past a vertical position, said swing arm being arranged in the outboard position to extend outwardly and upwardly above the top portion and sufficiently close to the loading end of the vehicle so that a free end portion thereof guides a cable attached to the boat to hold the boat away from the vehicle as it is moved in an outboard portion of travel between unloaded position and drops to the inboard position as the swing arm moves past the vertical position during the pull of the boat, said swing arm having a base portion swingable about a laterally extending shaft, said shaft having bracket means at its opposite ends, said bracket means being respectively releasably mounted on said longitudinal support members for sliding, guided movement therealong thereby making the swing arm adjustable along said longitudinal support members to change the extent of overhang of the swing arm in the outboard position, said bracket means being retained in a fixed position relative to said longitudinal support members by a locking member, hoist means to pull the cable from a point opposite the boat loading end of the vehicle to move the boat from an unloaded position to a loaded position on the boat carrier rack by a winding of the cable as the swing arm pivots from the outboard to the inboard position.

2. In boat loading apparatus as set forth in claim 1 including an upright support member at the end of the vehicle opposite the loading end for supporting said hoist means.

3. In boat loading apparatus as set forth in claim 2 including an intermediate support member between said upright support member and said rack to further support said upright support member during the loading of the boat onto the rack.

4. In boat loading apparatus as set forth in claim 2 wherein the upper end of said upright support member has means to support the front end of the boat.

5. In boat loading apparatus as set forth in claim 2 wherein the upper end of said upright support member has a pulley to guide said cable.

6. In the boat loading apparatus as set forth in claim 2 wherein the length of said upright support member is adjustable.

7. In boat loading apparatus as set forth in claim 1 wherein said swing arm has a pulley at its free end to guide the cable.

8. In boat loading apparatus as set forth in claim 1 wherein said swing arm has extension portions at its free end to be engaged by an end portion of the cable attached to the boat to cause the swing arm to swing with the movement of the boat as the boat is being drawn by the cable.

9. In boat loading apparatus as set forth in claim 1 including means to bias the swing arm toward the outboard position.

10. In boat loading apparatus as set forth in claim 1 including a rest for said swing arm in the inboard position.

11. Boat loading apparatus for use with a vehicle comprising:

a boat carrier rack with a pair of spaced, lateral support members having side support brackets at each end thereof adapted to releasably fasten to the top portion of the vehicle body, each said lateral support member being adjustably movable relative to the associated support brackets to adjust the effective width thereof, a pair of spaced, longitudinal support members connected between said lateral support members, said longitudinal support members being adjustably movable relative to said lateral support members to adjust the effective length thereof, and a roller mounted adjacent one of said lateral support members at the loading end to provide a low friction support surface for the boat;

a swing arm pivotally mounted between said longitudinal support members to pivot about a lower pivot and having a pulley at the upper free end thereof, said swing arm adapted to swing between an inboard position disposed generally horizontally on a rest between said lateral support members and an outboard position extending outwardly and upwardly above the top of and sufficiently close to the loading end of the vehicle so that the free pulley end guides a cable attached to the boat to hold the boat away from the vehicle as it is moved in an outboard portion of travel from the outboard position past a vertical position by drawing the cable whereby the swing arm will then drop to the inboard position, said swing arm having an outer, lateral shaft which telescopes over an inner, lateral shaft, the inner lateral shaft having the ends affixed to end brackets slidably movable along and releasably fastened to said longitudinal support members to permit the swing arm to be adjustably moved along the longitudinal support members, said swing arm having a biasing means to bias the swing arm toward the outboard position;

a winch including a drum and a crank handle to pull the cable to move the boat, said winch being mounted on an upright support member removably supported in a bracket at the front of the vehicle, said upright support member having releasably held telescoping sections locked by a locking pin to vary the effective length thereof, said upright support member having means to support the forward end of the boat; and an intermediate support member releasably fastened between the upright support member and one of the lateral support members, said intermediate support member being adjustably movable relative to one of said lateral support members to adjust the effective length thereof.

12. Boat loading apparatus as set forth in claim 11 wherein said lateral and longitudinal support members are made of tubular material having a substantially square transverse cross-section.

13. Boat loading apparatus as set forth in claim 11 wherein said longitudinal support members are adjustably movable relative to said lateral support members by providing a telescoping support sleeve on one of said lateral support members for each longitudinal support member, aligned apertures in said longitudinal support members and said telescoping support sleeve and locking pins releasably inserted into said aligned apertures.

14. Boat loading apparatus as set forth in claim 11 wherein said bracket for the upright support member releasably fastens to the front bumper of the vehicle.

15. Boat loading apparatus as set forth in claim 11 wherein said means to support the forward end of the boat includes outwardly projecting lateral support arms at the upper end of said support member terminating in upright earlike portions.

16. Boat loading apparatus as set forth in claim 11 wherein the intermediate support member is adjustably movable relative to the one lateral support member by providing a telescoping support sleeve on said one lateral support member aligned apertures in the telescoping support sleeve and intermediate support member and a locking pin releasably inserted into said aligned apertures.

17. Boat loading apparatus as set forth in claim 11 which includes cable guide means on the carrier rack around which the cable is reefed to unload the boat from the carrier rack in a reverse movement thereof.

* * * * *